United States Patent
S.M. et al.

(10) Patent No.: US 12,548,616 B1
(45) Date of Patent: Feb. 10, 2026

(54) COMMON MODE SHIFTING OF SINGLE-ENDED SIGNALS BASED ON LINEARITY ANALYSIS

(71) Applicant: Cadence Design Systems, Inc., San Jose, CA (US)

(72) Inventors: Ashwin S.M., Vaikom (IN); Venkata Mahesh Thorata, Toronto (CA); Anirudha Anil Shelke, Pune (IN); Avinash Ugrappa, Bengaluru (IN); Nikhil Raghavendra Rao, Bengaluru (IN); Jeffin Joy, Thodupuzha (IN)

(73) Assignee: Cadence Design Systems, Inc., San Jose, CA (US)

( * ) Notice: Subject to any disclaimer, the term of this patent is extended or adjusted under 35 U.S.C. 154(b) by 64 days.

(21) Appl. No.: 18/667,153

(22) Filed: May 17, 2024

Related U.S. Application Data

(60) Provisional application No. 63/502,801, filed on May 17, 2023.

(51) Int. Cl.
  *G11C 11/40* (2006.01)
  *G11C 11/4093* (2006.01)
  *H03F 3/45* (2006.01)
  *H03K 19/0175* (2006.01)

(52) U.S. Cl.
  CPC ...... *G11C 11/4093* (2013.01); *H03F 3/45475* (2013.01); *H03K 19/017509* (2013.01)

(58) Field of Classification Search
  CPC ............ G11C 11/4093; H03F 3/45475; H03K 19/017509
  See application file for complete search history.

(56) References Cited

U.S. PATENT DOCUMENTS

| | | | |
|---|---|---|---|
| 9,973,355 B1 * | 5/2018 | Cartina | ............ H04L 25/03057 |
| 2015/0091631 A1 * | 4/2015 | Yildirim | ................. G11C 7/14 |
| | | | 327/332 |

* cited by examiner

*Primary Examiner* — Xiaochun L Chen
(74) *Attorney, Agent, or Firm* — Mark H. Whittenberger, Esq.; Holland & Knight LLP

(57) ABSTRACT

A first circuit receives a single-ended signal and a reference voltage. The first circuit shifts a common mode of the single-ended signal based on a level-shifting current. A preamplifier receives the single-ended signal and the reference voltage from the first circuit and amplifies the single-ended signal to obtain an amplified signal. A decision feedback equalizer (DFE) system receives the amplified signal and the reference voltage from the preamplifier. The DFE system generates a first average signal height of the amplified signal above the reference voltage and a second average signal height of the amplified signal below the reference voltage. A second circuit provides the level-shifting current to the first circuit and adjusts the level-shifting current based on a linearity parameter associated with the amplified signal.

20 Claims, 6 Drawing Sheets

COMMON MODE SHIFTING OF SINGLE-ENDED SIGNALS BASED ON LINEARITY ANALYSIS

RELATED APPLICATION(S)

This application claims benefit of U.S. Provisional Application No. 63/502,801, filed 17 May 2023, the entire contents of which are incorporated herein by reference.

TECHNICAL FIELD

The present disclosure relates to the field of single-ended signals and, in particular, to common mode shifting of single-ended signals based on linearity analysis.

BACKGROUND

Single-ended signals are commonly utilized to transmit signals between computing systems and memory. Based on the variance above or below a reference voltage associated with the single-ended signal, a receiver determines a digital value (e.g., 1 or 0) represented by the single-ended signal. Various equalization techniques are commonly implemented at the receiver to improve performance.

DETAILED DESCRIPTION

Figure 1:
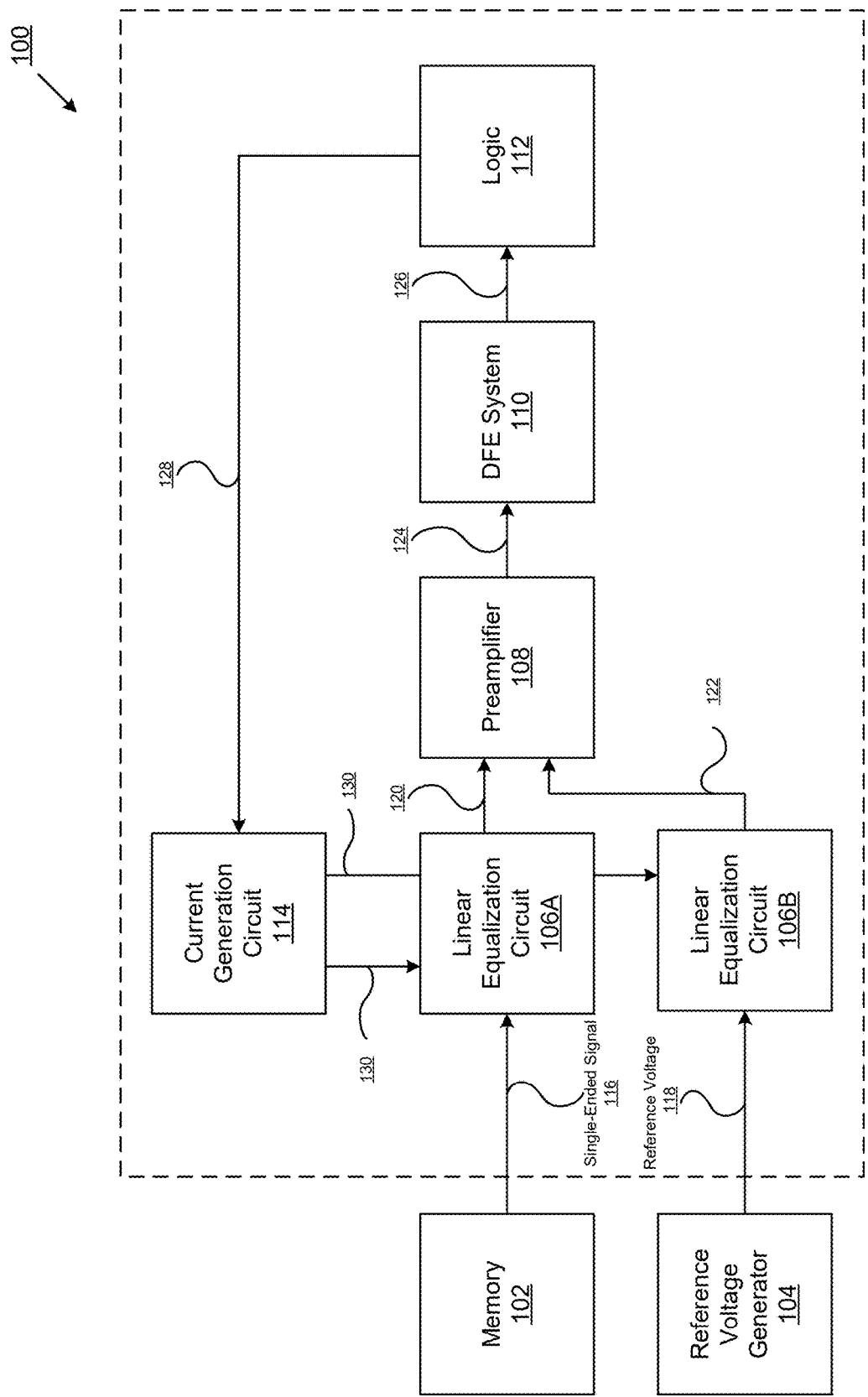
FIG. 1 is a block diagram of an implementation of a receiver architecture for common mode shifting of single-ended signals based on linearity analysis, in accordance with some embodiments of the present disclosure.

Communications systems transmit and receive signals at a high speed (e.g., up to 24 Gigabits/second). Single-ended signaling is commonly used to transmit signals between a computing system (e.g., a system-on-a-chip (SoC)) and a memory (e.g., a dynamic random access memory (DRAM)) over a channel (e.g., a DRAM channel). In single-ended signaling, a signal represented by a varying voltage is transmitted over a channel (e.g., a DRAM channel). The voltage varies above or below a reference voltage (VREF) associated with the single-ended signal. Based on the variance above or below the reference voltage, the receiver determines a digital value (e.g., 1 or 0) represented by the signal. In high-speed single-ended signaling systems, non-linearities can be introduced at a receiver side of a channel. For example, a variation within a preamplifier of a receiver circuit can cause the receiver circuit to introduce nonlinearities into an output signal (amplified signal) of the preamplifier. These nonlinearities can cause an asymmetry of single-ended signal above or below the reference voltage that can result in a high bit error rate (e.g., one bit in every million bits received is incorrect) at the output of the receiver.

To reduce introduced nonlinearities, equalization techniques can be implemented within a receiver to provide an analog signal with an ascertainable digital value. For example, some receivers adjust (e.g., level-shift) a reference voltage associated with a single-ended signal to correct asymmetry above or below the reference voltage. While such adjustments can reduce asymmetry of an inner "eye" opening of a single-ended signal, asymmetry of an outer "eye" opening of the single-end signal can yet persist after such reference voltage adjustments. When traces of analog signal are physically measured and overlayed, a signal pattern is generated, which can be viewed using a lab instrument (e.g., an oscilloscope, an eye diagram analyzer, etc.). When overlayed, the analog signals form a shape that resembles a partially closed eye. The characteristics of the eye (e.g., eye opening, eye width, eye amplitude, etc.) can be observed to evaluate the received signal. Generally, the more symmetric the eye opening, the better the signal. Reference voltage adjustments can reduce asymmetry of the inner eye opening of the amplified signal. The inner eye opening is defined by the difference between the lowest measured voltage of the amplified signal at logic high (i.e., logic '1') and the highest measured voltage of the amplified signal at logic low (i.e., logic '0'). However, asymmetry of the outer eye opening can persist after such reference voltage adjustment. The outer eye opening is defined by the overall peak-to-peak voltage of the single-ended signal.

Aspects and implementations of the present disclosure address the above and other deficiencies by providing systems and methods for common mode shifting of single-ended signals based on linearity analysis. The methodology of common mode shifting single-ended signals based on linearity analysis can reduce asymmetry between a lowest measured voltage of an amplified signal and a highest measured voltage of an amplified signal. Aspects and embodiments of the present disclosure can provide a receiver capable of detecting asymmetry in an amplified single-ended signal and correcting the detected asymmetry by shifting a common mode of the single-ended signal based on linearity analysis. The receiver can include a first linear equalization circuit to receive a single-ended signal and to shift a common mode of the single-ended signal based on a level-shifting current. In some embodiments, the receiver architecture includes a second linear equalization circuit to receive a reference voltage associated with the single-ended signal and to shift the reference voltage based on the linear equalization circuit. In some embodiments, the receiver includes a preamplifier coupled to receive the single-ended signal and the reference voltage from the first linear equalization circuit and the second linear equalization circuit, respectively. The preamplifier can amplify the single-ended signal to obtain an amplified signal. In some embodiments, the receiver includes a decision feedback equalizer (DFE) system coupled to receive the amplified single-ended signal and the reference voltage from the preamplifier. The DFE system is a non-linear equalizer that relies on decisions of previous symbols to correct the current symbol, as described in detail below.

In some embodiments, the receiver includes a current generation circuit to generate and provide a level-shifting current to the first linear equalization circuit and/or the second linear equalization circuit. The current generation circuit is configured to adjust the level-shifting current based on a linearity parameter associated with the amplified signal. In some embodiments, the linearity parameter is dependent on the power supply voltage (e.g., VDDIO) for an input/output (I/O) interface associated with the receiver. VDDIO denotes a voltage of a power supply distribution network (PDN) that powers circuitry associated with the receiver. The output of the preamplifier (i.e., the amplified signal) swings between a high voltage (e.g., 280 mV) and a low voltage (e.g., −360 mV) based on voltage variation that appears at the VDDIO rails of the power supply. Due to this dependency, the current generation circuit can adjust the level-shifting current based on the voltage variation of VDDIO.

In some embodiments, the linearity parameter is dependent on a process corner of a circuit (e.g., the preamplifier) associated with the receiver. The current generation circuit is configured to adjust the level-shifting current based on the process corner of the preamplifier. The process corner represents worst-case parameter variations (e.g., slow corner, fast corner, etc.) within which the preamplifier can operate. At the fast corner, the magnitude of a positive peak voltage (a logic high signal) of the single-ended signal is greater than the magnitude of a negative peak voltage (a logic low signal) at the output of the preamplifier. To equalize the asymmetry between the logic low signal and the logic high signal at the slow corner and the fast corner, the current generation circuit adjusts the level-shifting current based on the process corner, as described in detail below.

In some embodiments, the linearity parameter depends on a difference between a first average signal height of the amplified signal above the reference voltage (also referred to as "logic high average signal height" herein) and a second average signal height of the amplified signal below the reference voltage (also referred to as "logic low average signal height" herein). The DFE system utilizes an adaptive algorithm (e.g., Sign-Sign Least Mean Square (SSLMS)) to determine the logic high average signal height and the logic low average signal height. In some embodiments, the receiver includes logic (e.g., hardware logic) coupled between the DFE system and the current generation circuit. The logic is configured to determine the absolute magnitude difference between the logic high average signal height and the logic low average signal height. Responsive to determining the absolute magnitude difference between the logic low average signal height and the logic high average signal height is greater than the threshold criterion, logic provides feedback to the current generation circuit to adjust the level-shifting current accordingly.

Technical advantages of the present disclosure include reducing asymmetry between a logic high state and a logic low state of amplified single-ended signals of a receiver, allowing the receiver to function at an increased overall frequency, thereby improving performance.

FIG. 1 is a block diagram of an implementation of a receiver architecture for common mode shifting of a single-ended signal based on linearity analysis. Illustrated is a memory 102 and a reference voltage generator 104 coupled to receiver 100. The illustrated receiver 100 includes a linear equalization circuit 106A, a linear equalization circuit 106B, a preamplifier 108, a decision feedback equalizer (DFE) system 110, logic 112, and a current generation circuit 114. In some embodiments, receiver 100 can be implemented within a processing device (e.g., a system-on-chip (SoC), a graphics processing unit (GPU), etc.) It is appreciated that, in some embodiments, receiver 100 can be implemented within memory 102, and a processing device (e.g., SoC, GPU, etc.) can implement a corresponding transmitter. In some embodiments, the receiver and related circuitry can be implemented within a transceiver. In some embodiments, memory 102 can include any memory device (e.g., a dynamic random-access memory (DRAM), a non-volatile memory, etc.). Memory 102 is coupled to linear equalization circuit 106A through a memory interface (also referred to as a "memory channel" herein). Examples of a memory interface include a double-data rate (DDR) memory interface, a dual-channel DDR memory interface, a DRAM memory interface, etc.

Memory 102 generates single-ended signal 116 and transmits the single-ended signal 116 to linear equalization circuit 106A. Reference voltage generator 104 generates a reference voltage 118 (also referred to as "Vref 118" herein) and transmits (e.g., via a memory channel) the reference voltage 118 to linear equalization circuit 106B. In some embodiments, reference voltage generator 104 can generate reference voltage 118 to be at the middle of a voltage swing of the single-ended signal 116. In some embodiments, reference voltage generator 104 can be located within the receiver and generate reference voltage 118 from within receiver 100.

Linear equalization circuit 106A is coupled to receive (e.g., via a memory channel) a single-ended signal 116 from memory 102. linear equalization circuit 106B is coupled to receive an accompanying reference voltage 118 associated with single-ended signal 116 from reference voltage generator 104. In order to produce a symmetric single-ended signal and improve timing margins and accuracy of receiver 100, linear equalization circuit 106A can adjust (e.g., level-shift) single-ended signal based on level-shifting current 130 to produce single-ended signal 120. Similarly, in order to improve timing margins and accuracy of the receiver 100, linear equalization circuit 106B can adjust (e.g., level-shift) reference voltage 118 based on level-shifting current 130 to produce reference voltage 122. In some embodiments, linear equalization circuit 106A can adjust (e.g., level-shift, attenuate, etc.) single-ended signal 116 to be within an operating range of preamplifier 108. For example, preamplifier 108 may have a total operating voltage range of 100 mV, but single-ended signal 116 may have a peak-to-peak voltage of 200 mV. Accordingly, linear equalization circuit 106A can attenuate signal 116 such that signal 116 has a peak-to-peak voltage of 100 mV and, therefore, is within the operating range of preamplifier 108. In some embodiments, linear equalization circuit 106A and linear equalization circuit 106B are the same circuit. For example, linear equalization circuit 106A and linear equalization circuit 106B can be linear equalization circuit 200, described below with respect to FIG. 3.

Preamplifier 108 is coupled to two terminals to receive single-ended signal 120 from linear equalization circuit 106A and reference voltage 122 from linear equalization circuit 106B, respectively. Preamplifier 108 amplifies a difference between single-ended signal 120 and reference voltage 122 to produce amplified signal 124. In some embodiments, preamplifier 108 can be implemented with p-type metal-oxide-semiconductor (PMOS) transistors (i.e., a PMOS amplifier). In some embodiments, preamplifier 108 can be implemented with n-type metal-oxide-semiconductor (NMOS) transistors (i.e., an NMOS amplifier). In some embodiments, preamplifier 108 can be a differential amplifier, and amplified signal 124 can be a differential signal. It can be appreciated that numerous alternative embodiments of preamplifier 108 are possible with respect to the present disclosure.

Decision feedback equalizer (DFE) system 110 is coupled to receive amplified signal 124 from preamplifier 108. DFE 110 is a non-linear equalizer that relies on decisions of previous symbols (i.e., a high logic value or a low logic value) to correct the current symbol. The DFE system 110 removes inter-symbol interference (ISI) from a sample of a received signal (e.g., amplified signal 124) without amplifying noise associated with the received signal. The DFE system 110 determines and applies a tap value to a portion of the current symbol to correct distortion. The DFE system 110 determines, in part, a tap value for the portion of the current symbol based on an average signal height of the amplified signal 124 above the reference voltage (referred to as "logic high average signal height" herein) and an average signal height of the amplified signal 124 below the reference voltage (referred to as "logic low average signal height" herein). The DFE system 110 determines the tap value by averaging a first tap magnitude corresponding to the logic high average signal height and a second tap magnitude corresponding to the logic low average signal height.

In one example, the DFE system 110 can determine the logic high average signal height is 281 mV, and the corresponding first tap magnitude is 56 mV. The DFE system 110 can further determine the logic low average signal height is −357.5 mV, and the corresponding second tap magnitude is 121.5 mV. The DFE system 110 can average the first tap magnitude (i.e., 56 mV) with the second tap magnitude (i.e., 121.5 mV) to determine a tap value of 88.75 mV. Accordingly, an asymmetric signal at the input of DFE system 110 can cause DFE system 110 to compute a tap value that is suboptimal (e.g., more than 20 mV greater or lesser than a first tap magnitude and/or a second tap magnitude). Such a tap value may minimally improve the single-ended signal. Conversely, a symmetric signal at the input of DFE system 110 can result in a more suitable tap value (e.g., a tap value within 5 mV of a first tap magnitude and/or a second tap magnitude). For example, the DFE system 110 can determine the logic high average signal height is 305 mV, and the corresponding first tap magnitude is 70 mV. The DFE system 110 can further determine the logic low average signal height is −309 mV, and the corresponding second tap magnitude is 76 mV. The DFE system 110 can average the first tap magnitude (i.e., 56 mV) with the second tap magnitude (i.e., 121.5 mV) to determine a tap value of 73 mV. Accordingly, level-shifting procedures described herein can create a symmetrical signal that allows DFE system 110 to determine suitable tap values for the signal.

DFE system 110 determines a logic high average signal height of amplified signal 124 and a logic low average signal height of amplified signal 124, as described above. DFE system 110 is further coupled to provide the logic low average signal height and the logic high average signal height to logic 112. In some embodiments, DFE system 110 can utilize an adaptive algorithm to determine the logic high average signal height and the logic low average signal height. The adaptive algorithm can include, and is not limited to, a sign-sign least-mean-square (SSLMS) algorithm, a normalized least-mean-square (NLMS) algorithm, a variable-step least-mean-square (VSLMS) algorithm, a recursive least squares (RLS) algorithm, etc.

Logic 112 is coupled to receive a logic low average signal height and a logic high average signal height from DFE system 110. Logic 112 can compute a difference between the logic low average signal height and the logic high average signal height. A large difference (e.g., 80 mV) between the logic low average signal and the logic high average signal height can indicate the single-ended signal is asymmetric. Accordingly, the difference between the logic low average signal heights and the logic high average signal height can affect a linearity parameter at the output of the DFE system 110 that indicates nonlinearities may have been introduced by a component (e.g., preamplifier 108) of the receiver (e.g., receiver 100). Logic 112 can determine the absolute magnitude difference between the first average signal height and the second average signal height is greater than a threshold criterion. For example, logic 112 may determine the difference between the first average signal height and the second average signal height is 30 mV and, therefore, is greater than the threshold criterion of 10 mV. Responsive to determining the absolute magnitude difference between the first average signal height and the second average signal height (e.g., 30 mV) is greater than the threshold criterion (e.g., 10 mV), logic 112 can provide feedback to adjust (e.g., level-shift) a common mode of a single-ended signal (e.g., single-ended 116) and to adjust (e.g., level-shift) a corresponding reference voltage (e.g., reference voltage 118). In some embodiments, logic 112 can be coupled to provide a current adjustment code to current generation circuit 114 to adjust current 130 according to the nonlinearity parameter (e.g., according to the difference between the first average signal height and the second average signal height). Logic 112 can be implemented using hardware (e.g., a processing device, processing circuitry, dedicated logic, microcode, hardware of a device, integrated circuit, etc.), software (e.g., instructions running or executing on a processing device (e.g., a microcontroller)), firmware, or a combination thereof.

Current generation circuit 114 is coupled between logic 112, linear equalization circuit 106A, and linear equalization circuit 106B. Current generation circuit 114 includes a process tracking portion to adjust level-shifting current 130 based on process corners that affects a linearity parameter of the amplified signal 124. Current generation circuit 114 further includes a portion to adjust level-shifting current 130 based on a power supply voltage (e.g., VDDIO) that affects a linearity parameter of the amplified signal 124. Current generation circuit 114 can include a portion to adjust level-shifting current 130 based on a current adjustment code received from logic 112.

The process tracking portion of current generation circuit 114 detects a process corner of a circuit (e.g., preamplifier 108). A process corner refers to variations of parameters when an integrated circuit (IC) design is fabricated on a semiconductor wafer. Process corners represent the worst-case parameter variations (e.g., process variation) within which a circuit (e.g., preamplifier 108) can operate. The worst case process corners include a slow corner (i.e., a circuit runs slower than expected) and a fast corner (i.e., a circuit runs faster than expected). At the fast corner, the magnitude of a positive peak voltage (a logic high signal) of the amplified signal 124 can be greater than the magnitude of a negative peak voltage (a logic low signal) of the amplified signal 124. To equalize the mismatch between the logic low signal and the logic high signal at the slow corner and the fast corner, the process tracking portion of the current generation circuit adjusts level-shifting current 130, as described in detail with respect to FIG. 3.

Current generation circuit 114 includes a portion to adjust level-shifting current 130 based on a power supply voltage (e.g., VDDIO) for the input/output (I/O) interface. VDDIO denotes a voltage of a power supply distribution network (PDN) that powers circuitry (e.g., receiver 100) described herein. It can be noted that VDDIO is merely one example of the power supply name and can vary depending on the implementation. Voltage variation that appears on the VDDIO rails of the power supply can be created by the power supply itself or by varying current loads. Amplified signal 124 swings between a peak-to-peak voltage proportional to VDDIO. For example, when VDDIO swings upward, a magnitude of the logic '1' signal amplitude of amplified signal 124 is lesser than (e.g., 50 mV lesser than) a magnitude of the logic '0' signal amplitude of amplified signal 124. When VDDIO swings downward, a magnitude of the logic '0' signal amplitude of amplified signal 124 is lesser than (e.g., 50 mV lesser than) a magnitude of the logic '1' signal amplitude of amplified signal 124. Due to this dependency, current generation circuit 114 can adjust level-shifting current 130 according to the voltage variation of VDDIO, as described below with respect to FIG. 3. In some embodiments, current generation circuit 114 is coupled to receive the current adjustment code from logic 112. Current generation circuit 114 includes a portion to adjust level-shifting current 130 based on a current adjustment code, as described in detail with respect to FIG. 3.

Figure 2:
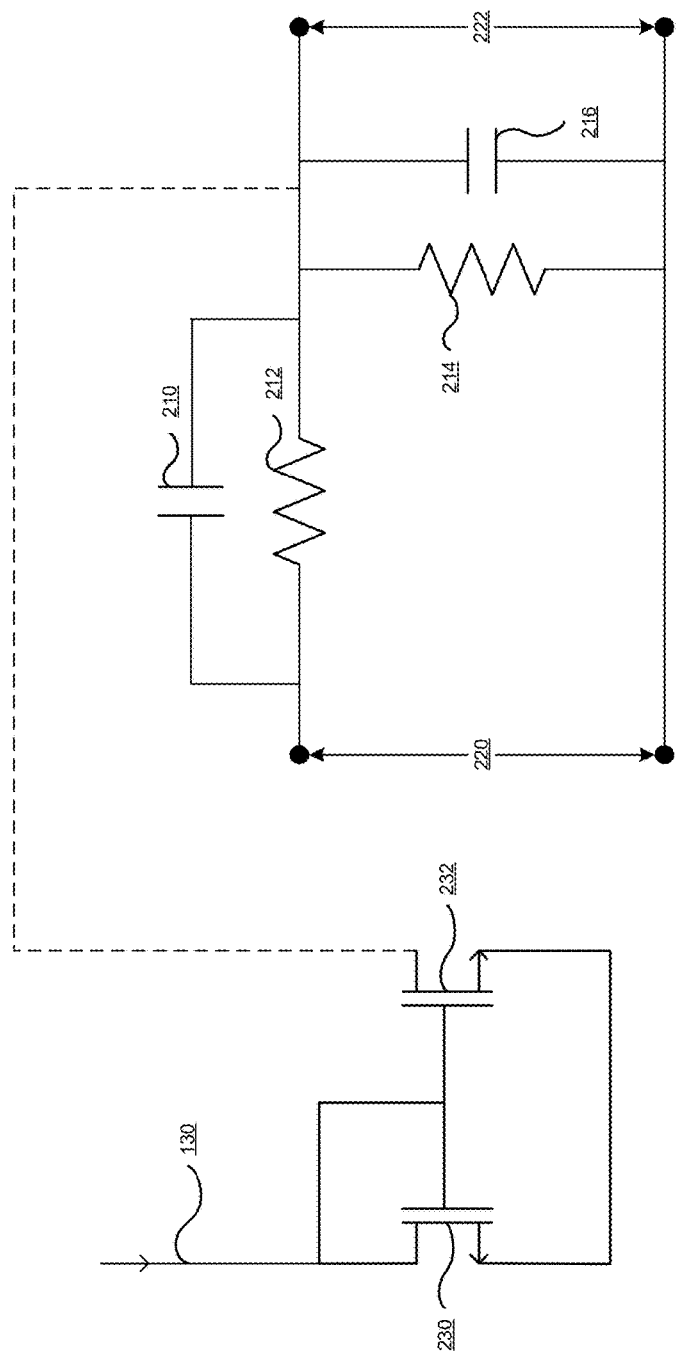
FIG. 2 is a circuit diagram of a linear equalization circuit to shift a common mode of single-ended signals based on a level-shifting current, in accordance with some embodiments of the present disclosure.

FIG. 2 is a circuit diagram of a linear equalization circuit 200 to shift a common mode of a single-ended signal (e.g., single-ended signal 116). In some embodiments, linear equalization circuit 200 can correspond to linear equalization circuit 106A of FIG. 1 and is coupled to receive a single-ended signal (e.g., single-ended signal 116) from a memory (e.g., memory 102). In some embodiments, linear equalization circuit 200 can correspond to linear equalization circuit 106B of FIG. 1 and is coupled to receive a reference voltage (e.g., reference voltage 118) from a reference voltage generator (e.g., reference voltage generator 104).

In some embodiments, linear equalization circuit 200 includes a portion to attenuate a single-ended signal (e.g., single-ended signal 116) and/or to attenuate a reference voltage (e.g., reference voltage 118) corresponding to the single-ended signal to be within operating range of a pre-amplifier (e.g., preamplifier 108). As illustrated with respect to FIG. 2, the portion to attenuate the single-ended signal and/or the reference voltage includes a first capacitor 210 coupled in parallel to a first resistor 212, a second resistor 214 coupled in parallel to a second capacitor 216, an input channel 220 and an output channel 222.

Linear equalization circuit 200 includes a portion to additionally level-shift a common mode of a single-ended signal (e.g., single-ended signal 160) and/or a corresponding reference voltage (e.g., reference voltage 118) based on a level-shifting current (e.g., level-shifting current 130). The portion of linear equalization circuit 200 to level-shift a common mode of the single-ended signal and/or to level-shift a corresponding reference voltage includes a first NMOS transistor 230 coupled to a second NMOS transistor 232. As illustrated with respect to FIG. 2, the first NMOS transistor 230 and second NMOS transistor 232 form a transistor pair.

Figure 3:
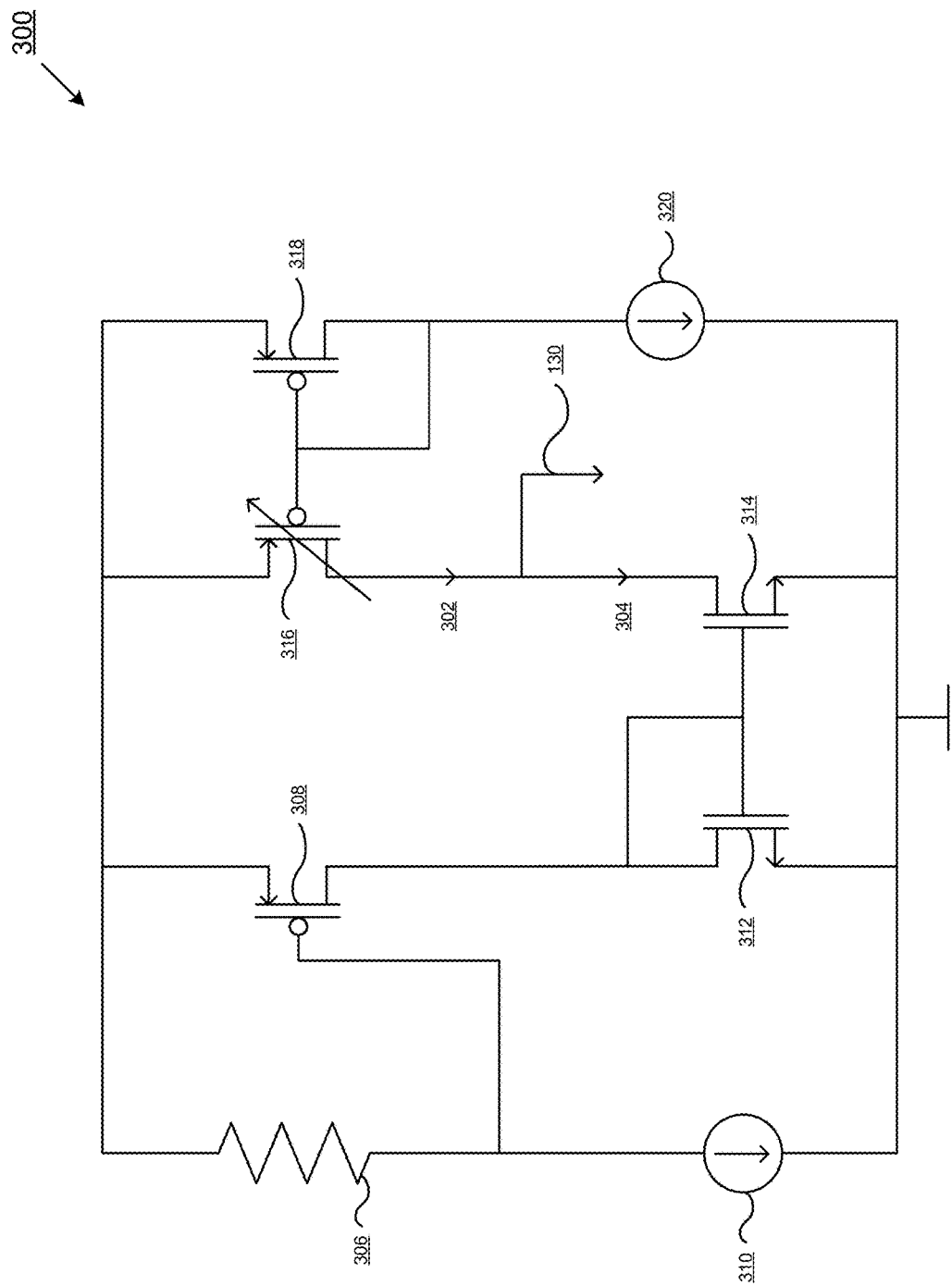
FIG. 3 is a circuit diagram of a current generation circuit to adjust a level-shifting current based on a linearity parameter, in accordance with some embodiments of the present disclosure.

FIG. 3 is a circuit diagram of a current generation circuit 300 to generate a level-shifting current 130. In some embodiments, current generation circuit 300 can correspond to current generation circuit 114 of FIG. 1. Current generation circuit 300 generates level-shifting current 130 based on a process tracking current 304 and/or a current 302. Current generation circuit 300 includes a portion to detect a process corner of a circuit (e.g., preamplifier 108) and adjust process tracking current 304 based on the process corner of the preamplifier 108. The process corner represents worst-case process variations (e.g., slow corner, fast corner, etc.), as described with respect to FIG. 1. Current generation circuit 300 is configured to generate a process tracking current 304 that varies according to the process variations of preamplifier 108. The portion of current generation circuit 300 to generate and/or adjust process tracking current 304 includes a current source 310 to generate a reference current for PMOS 308. PMOS 308 is coupled in parallel to a process resistance 306. The gate-to-source voltage (VGS) that falls across the gate-source terminal of PMOS 308 can be represented by the following equation: VGS=I*R, where R is the process resistance 306 and I is current source 310. PMOS 308 is the same or substantially similar (e.g., transistor parameters within 10% of each other). Accordingly, the process variation of PMOS 308 will be the same or substantially similar to the process variation of PMOS transistors of the preamplifier 108. As such, current flowing through PMOS 308 (i.e., process tracking current 304) varies according to process variations associated with preamplifier 108. For example, if preamplifier 108 is at slow corner, the threshold voltage of PMOS 308 and the threshold voltage of the transistors of preamplifier 108 will be increased (e.g., 100 mV above a parameter threshold voltage), but VGS will remain fixed, and process tracking current 304 will be proportionally decreased. In another example, if preamplifier 108 is at the fast corner, the threshold voltage of the transistors of preamplifier 108 will be decreased (e.g., 100 mV below a parameter threshold voltage), and process tracking current 304 will be proportionally increased.

Current generation circuit 300 includes a portion to generate current 302 based on a current source 320. In some embodiments, current source 320 is dependent on or controlled by a power supply voltage (e.g., VDDIO). VDDIO denotes a voltage of a power supply distribution network (PDN) that powers circuitry (e.g., receiver 100, current generation circuit 300, etc.) described herein. VDDIO can define a voltage swing for an I/O interface. For example, a voltage over the I/O interface can swing between 2.7 Volts and 3.3 Volts. An amplified signal (e.g., amplified signal 124) swings between a peak-to-peak voltage proportional to VDDIO, as described with respect to FIG. 1. Because of this dependency, current source 320 can depend on VDDIO. For example, if VDDIO is at a downward swing (e.g., 1.4 Volts), current source 320 can proportionally decrease the current it provides such that current 302 is proportionally decreased. In another example, if VDDIO is at an upward swing (e.g., 3.5 Volts), current source 320 can proportionally increase the current it provides such that current 302 is proportionally increased. As such, due to the dependency of an amplified single-ended signal (e.g., amplified signal 124) on VDDIO, current generation circuit 300 generates a current 302 that is proportional to the VDDIO voltage swing and adjusts level-shifting current 130 based on the current 302. Current generation circuit 300 can further provide the level-shifting current 130 to linear equalization circuit 200 to level-shift the single-ended signal and/or a corresponding reference voltage based on the level-shifting current 130.

Current generation circuit 300 includes a current output digital to analog converter (referred to generally as "current DAC" herein) to further adjust current 302 according to a digital code applied to an input of the current DAC. In some embodiments, the current DAC is coupled to receive a current adjustment digital code from logic 112. Logic 112 generates the current adjustment digital code based on a linearity parameter that represents an absolute magnitude difference between a logic low average signal height of an amplified signal (e.g., amplified signal 124) and a logic high average signal height of the amplified signal 124, as described above with respect to FIG. 1. The current DAC includes a current source 320 to generate a reference current, and a PMOS 318 coupled to an adjustable PMOS 316. The current DAC adjusts the adjustable PMOS 316 to increase or decrease current 302 according to a digital code received from logic 112. For example, current generation circuit 300 can receive a digital code from logic 112, indicating that the absolute magnitude difference between a logic low average signal height of the amplified signal and the logic high average signal height of the amplified signal is 94 mV. The difference of 94 mV indicates that the amplified signal (e.g., amplified signal 124) at the output of the preamplifier (e.g., preamplifier 108) is not symmetric. Responsive to receiving the indication that the absolute magnitude difference is 94 mV, current generation circuit 300 can adjust the adjustable PMOS 316 such that current 302 is proportionally increased and level-shifting 130 is proportional increased. Current generation circuit 300 can further provide the level-shifting current 130 to linear equalization circuit 200 to level-shift the single-ended signal and/or a corresponding reference voltage based on the level-shifting current 130. In another example, current generation circuit 300 can receive a digital code from logic 112 indicating that the absolute magnitude difference between the logic low average signal height of the amplified signal and the logic high average signal height of the amplified signal is 1 mV. Logic 112 can determine that the difference of 1 mV is less than a threshold difference (e.g., 5 mV) and, therefore, determine that amplified signal 124 is sufficiently symmetrical. Responsive to receiving an indication that the absolute magnitude difference is 1 mV and is less than a threshold difference (e.g., 5 mV), current generation circuit 300 can maintain adjustable PMOS 316 such that current 302 is not increased. In some embodiments, logic 112 can determine whether the absolute magnitude difference is reducing towards the threshold difference or increasing away from the threshold difference and thereby determine a direction in which the digital code can be shifted.

In some embodiments, current generation circuit 300 includes an NMOS 312 and an NMOS 314 to generate a level-shifting current 130 that is related to the difference between the current 302 and current 304. NMOS 312 and NMOS 314 subtract a current 304 coupled through a process tracking portion of the current generation circuit from a current 302 coupled through a current DAC portion of the current generation circuit. This configuration provides an output current (i.e., level-shifting current 130) and is coupled to provide level-shifting current 130 to linear equalization circuit 200. Linear equalization circuit 200 is configured to shift a common mode of the single-ended signal (e.g., single-ended signal 116) and/or shift a reference voltage (e.g., reference voltage 118) corresponding to the single-ended signal based on the level-shifting current, as described above with respect to FIG. 2.

Figure 4:
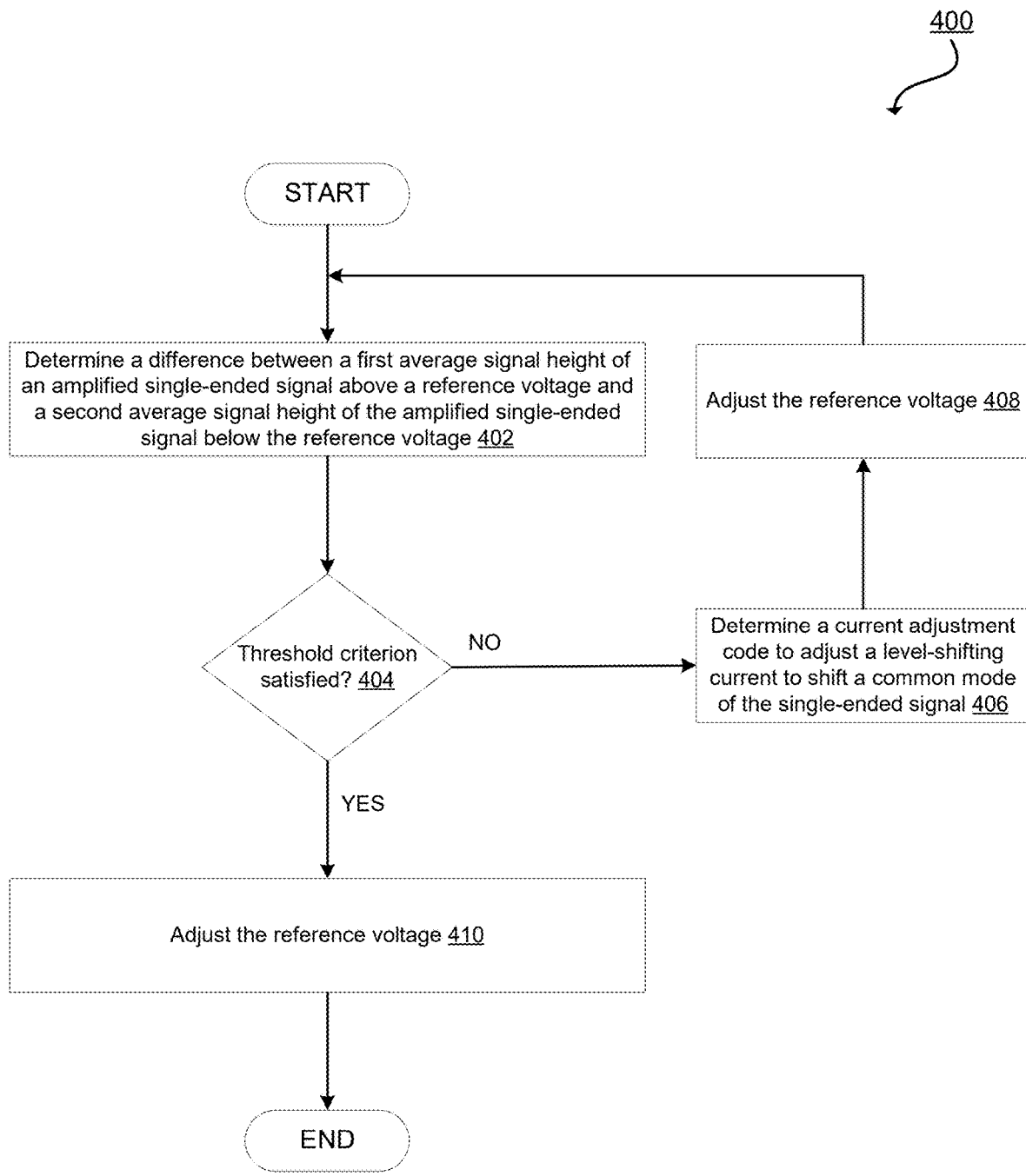
FIG. 4 is a flow diagram of adjusting a level-shifting current based on a linearity parameter, in accordance with some embodiments of the present disclosure.

FIG. 4 is a flow chart of a method 400 for adjusting a level-shifting shifting current based on a linearity parameter in accordance with some embodiments of the present disclosure. Method 400 is performed by processing logic that can include hardware (circuitry, dedicated logic, etc.), software (such as is run on a general-purpose computer system or a dedicated machine), firmware, a finite state machine (FSM), or some combination thereof. In some embodiments, method 400 can be performed by logic 112 of receiver 100 of FIG. 1. In other or similar embodiments, one or more operations of method 400 can be performed by one or more other machines not depicted in the figures.

For simplicity of explanation, the methods are depicted and described as a series of acts. However, acts in accordance with this disclosure may occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 402, processing logic determines a difference (e.g., an absolute magnitude difference) between a logic high average signal height of an amplified single-ended signal above a reference voltage and a logic low average signal height of the amplified single-ended signal below the reference voltage. A receiver uses the reference voltage (e.g., "ground") to determine a digital value (e.g., 1 or 0) represented by the single-ended signal based on variance above or below the reference voltage, as described above. At block 404, processing logic determines whether a threshold criterion is satisfied. The threshold criterion is satisfied if the difference (e.g., the absolute magnitude difference) between the logic high average signal height and the logic low average signal height is lesser than the threshold criterion (e.g., 5 mV). Responsive to determining the criterion is not satisfied, method 400 continues to block 406. Responsive to determining the criterion is satisfied, method 400 continues to block 410.

At block 406, processing logic determines a current adjustment code to adjust a level-shifting current to shift a common mode of the single-ended signal. Processing logic (e.g., logic 112) adjusts a digital current adjustment code based on the difference (e.g., the absolute magnitude difference) between the logic high average signal height and the logic low average signal height. A current generation circuit (e.g., current generation circuit 114) receives the digital current adjustment code and adjusts a level-shifting current based on the digital current adjustment code. A linear equalization circuit receives the level-shifting current and adjusts a common mode of the single-ended signal based on the level-shifting current.

At block 408, processing logic adjusts the reference voltage. In some embodiments, the reference voltage is adjusted to maximize an eye width associated with the single-ended signal. Responsive to adjusting the reference voltage, method 400 returns to block 402.

At block 410, processing logic adjusts the reference voltage. In some embodiments, the reference voltage is adjusted to maximize an eye width associated with the single-ended signal.

Figure 5A:
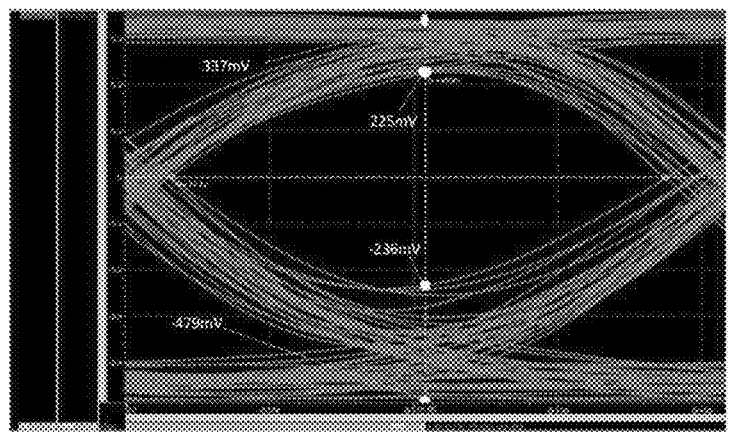
FIG. 5A illustrates an example of an amplified single-ended signal before common mode shifting of the single-ended signal based on linearity analysis, in accordance with some embodiments of the present disclosure.

FIG. 5A illustrates an eye diagram of an example amplified single-ended signal before common mode shifting of the single-ended signal based on linearity analysis, in accordance with some embodiments of the present disclosure. As illustrated, before common mode shifting based on linearity analysis, an inner eye opening of the eye diagram is between −236 mV and 225 mV, and an outer eye opening of the eye diagram is between −479 mV and 337 mV. The difference between the magnitude of the logic high outer eye opening (337 mV) and logic low outer eye opening (−479 mV) is −142 mV.

A DFE system (e.g., DFE system 110) can determine (e.g., via an adaptive SSLMS algorithm) the logic high average signal height is 281 mV (i.e., $$\left(i.e., \frac{225 \text{ mV} + 337 \text{ mV}}{2}\right)$$

) and the corresponding first tap magnitude is 56 mV. The DFE system further determines the logic low average signal height is −357.5 mV (i.e., $$\left(i.e., \frac{-479 \text{ mV} - 236 \text{ mV}}{2}\right)$$

) and the corresponding second tap magnitude is 121.5 mV. The DFE system averages the first tap magnitude (56 mV) and the second tap magnitude (121.5 mV) to determine an average tap value of 88.75 mV and applies the average tap value to the current symbol to correct distortion associated with the single-ended signal. Accordingly, due to the asymmetry at the outer eye opening, the DFE system can calculate an average tap value that is suboptimal (e.g., more than 20 mV greater or lesser than a first tap magnitude and/or a second tap magnitude).

Figure 5B:
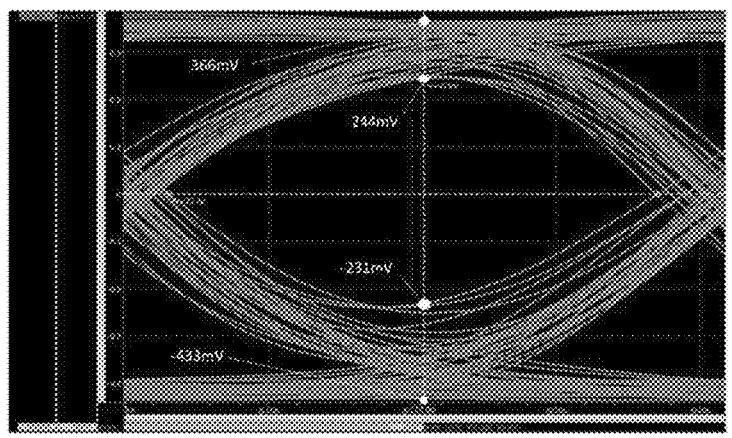
FIG. 5B illustrates an example of an amplified single-ended signal after shifting a common mode of the single-ended signal based on a process tracking circuit, in accordance with some embodiments of the present disclosure.

FIG. 5B illustrates an eye diagram of an example amplified single-ended signal after shifting a common mode of the single-ended signal based on a process tracking circuit, in accordance with some embodiments of the present disclosure. As illustrated, after shifting a common mode of an example single-ended signal based on a process tracking circuit, the inner eye opening of the eye diagram is between −231 mV and 244 mV, and the outer eye opening of the eye diagram is between −433 mV and 366 mV. The difference between the magnitude of the logic high outer eye opening (366 mV) and logic low outer eye opening (−433V) is −67 mV.

A DFE system (e.g., DFE system 110) can determine (e.g., via an adaptive SSLMS algorithm) the logic high average signal height is 305 mV (i.e., $$\left(i.e., \frac{366 \text{ mV} + 244 \text{ mV}}{2}\right)$$

) and the corresponding first tap magnitude is 61 mV. The DFE system further determines the logic low average signal height is −332 mV (i.e., $$\left(i.e., \frac{-433 \text{ mV} - 231 \text{ mV}}{2}\right)$$

) and the corresponding second tap magnitude is 101 mV. The DFE system averages the first tap magnitude (61 mV) and the second tap magnitude (101 mV) to determine an average tap value of 81 mV and applies the average tap value to the current symbol to correct distortion associated with the single-ended signal. Accordingly, a −67 difference between the magnitude of the logic high outer eye opening and logic low outer eye opening can result in an average tap value that is within 20 mV of the first tap magnitude and the second tap magnitude.

Figure 5C:
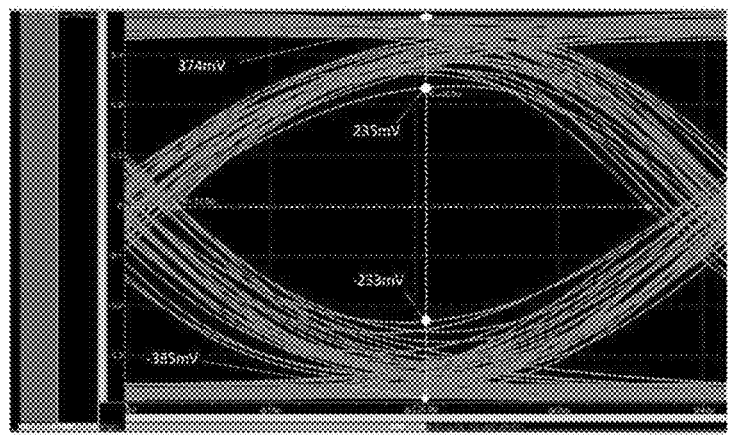
FIG. 5C illustrates an example of an amplified single-ended signal after shifting a common mode of the single-ended signal based on a process tracking circuit and a current digital-to-analog converter (DAC), in accordance with some embodiments of the present disclosure.

FIG. 5C illustrates an eye diagram of an example amplified single-ended signal after shifting a common mode of the single-ended signal based on a process tracking circuit and a current digital-to-analog converter (DAC), in accordance with some embodiments of the present disclosure. As illustrated, after common mode shifting based on a process tracking circuit and the current DAC, an inner eye opening of the eye diagram is between −233 mV and 235 mV, and an outer eye opening of the eye diagram is between −385 mV and 374 mV. The difference between the magnitude of the logic high outer eye opening (385 mV) and logic low outer eye opening (−374V) is 11 mV.

A DFE system (e.g., DFE system 110) determines (e.g., via an adaptive SSLMS algorithm) the logic high average signal height is 305 mV (i.e., $$\left(i.e., \frac{374 \text{ mV} + 235 \text{ mV}}{2}\right)$$

) and the corresponding first tap magnitude is 70 mV. The DFE system further determines the logic low average signal height is −309 mV (i.e., $$\left(i.e., \frac{-385 \text{ mV} - 233 \text{ mV}}{2}\right)$$

) and the corresponding second tap magnitude is 76 mV. The DFE system averages the first tap magnitude (70 mV) and the second tap magnitude (76 mV) to determine an average tap value of 73 mV and applies the average tap value to the current symbol to correct distortion associated with the single-ended signal. Accordingly, common mode shifting based on linearity analysis creates a symmetrical outer eye opening that allows the DFE system to calculate a suitable (e.g., within 5 mV of a first tap magnitude and a second tap magnitude) average tap value.

Figure 6:
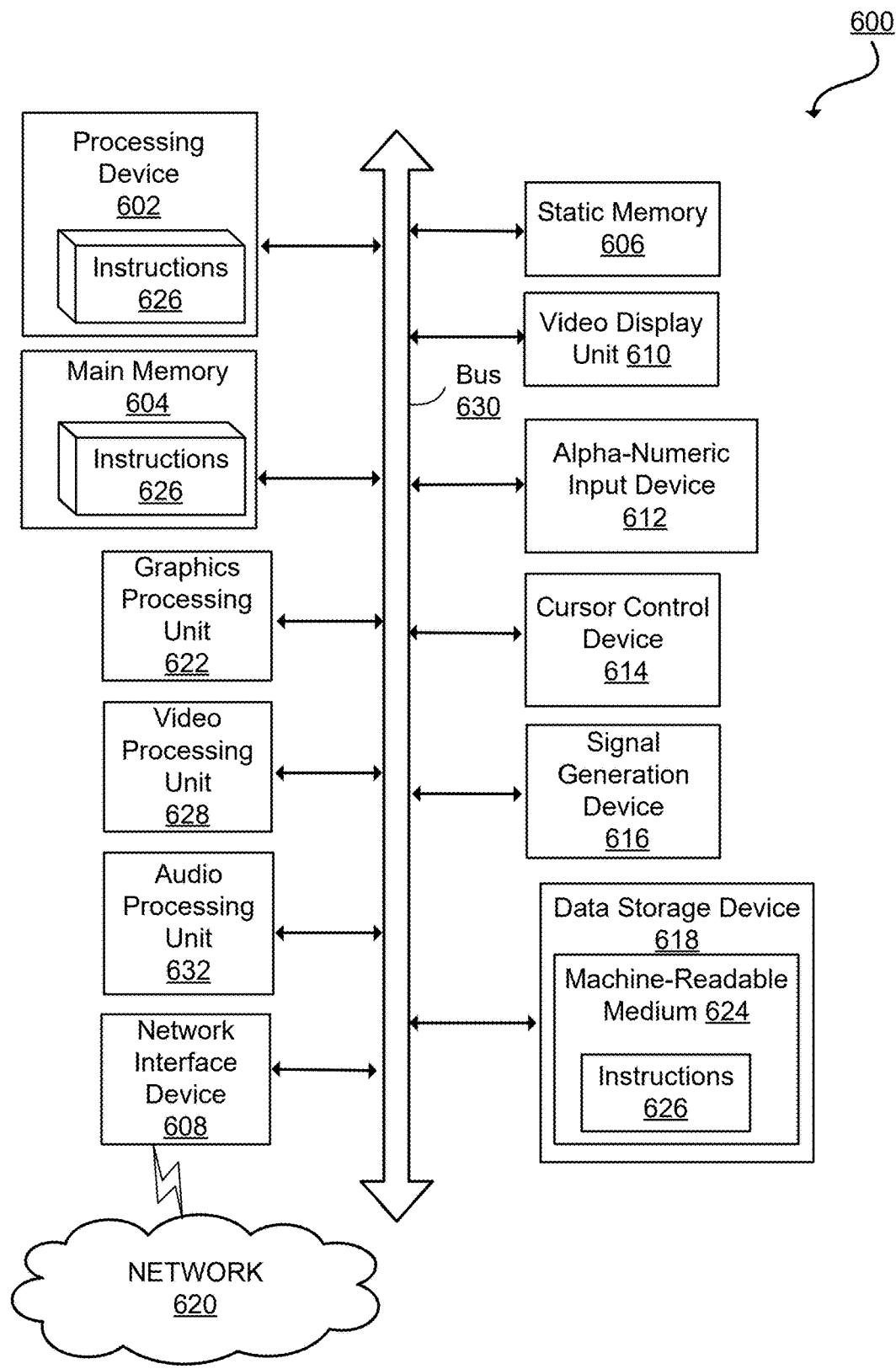
FIG. 6 depicts a diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In alternative implementations, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device can be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application-specific integrated circuit (ASIC), a field programmable gate array (FPGA), a digital signal processor (DSP), network processor, or the like. The processing device 602 can be configured to execute instructions 626 for performing the operations and steps described herein.

The computer system 600 can further include a network interface device 608 to communicate over the network 620. The computer system 600 also can include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 can include a machine-readable storage medium 624 (also known as a non-transitory computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media.

In some implementations, the instructions 626 includes instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine, allowing the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm can be a sequence of operations leading to a desired result. The operations are those requiring physical manipulations of physical quantities. Such quantities can take the form of electrical or magnetic signals capable of being stored, combined, compared, and otherwise manipulated. Such signals can be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems can be used with programs in accordance with the teachings herein, or it can prove convenient to construct a more specialized apparatus to perform a similar sequence of procedures. In addition, the present disclosure is not described with reference to any particular programming language, and any one in use in such computer systems can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications can be made thereto without departing from the broader spirit and scope of implementations of the disclosure as set forth in the following claims. Where the disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed is:

1. A receiver comprising:
   a first circuit to receive a single-ended signal and a reference voltage and to shift a common mode of the single-ended signal based on a level-shifting current;
   a preamplifier coupled to receive the single-ended signal and the reference voltage from the first circuit and to amplify the single-ended signal to obtain an amplified signal;
   a decision feedback equalizer (DFE) system coupled to receive the amplified signal and the reference voltage from the preamplifier and to generate a first average signal height of the amplified signal above the reference voltage and a second average signal height of the amplified signal below the reference voltage; and
   a second circuit coupled to provide the level-shifting current to the first circuit, the second circuit to adjust the level-shifting current based on a linearity parameter associated with the amplified signal.

2. The receiver of claim 1, further comprising logic coupled between the DFE system and the second circuit, wherein the logic is to:
   receive, from the DFE system, the first average signal height;
   receive, from the DFE system, the second average signal height;
   determine a difference between the first average signal height and the second average signal height, wherein the linearity parameter depends on the difference; and
   responsive to determining the difference between the first average signal height and the second average signal height is greater than a threshold criterion, provide an indication to the second circuit to adjust a first value of the level-shifting current to a second value of the level-shifting current.

3. The receiver of claim 2, wherein the logic comprising a finite state machine (FSM).

4. The receiver of claim 1, wherein the first circuit is further to level shift the reference voltage based on the level-shifting current.

5. The receiver of claim 4, wherein the first circuit comprising a first linear equalization circuit to level-shift the common mode of the single-ended signal and a second linear equalization circuit to level-shift the reference voltage, wherein the first linear equalization circuit and second linear equalization circuit are the same circuit.

6. The receiver of claim 1, wherein the first circuit is further to attenuate at least one of the single-ended signal or the reference voltage to be within an operating range of the preamplifier.

7. The receiver of claim 1, wherein the preamplifier is a differential amplifier and the amplified signal is a differential signal.

8. The receiver of claim 1, wherein the receiver is located within a dynamic random access memory (DRAM) or within a processing device.

9. An integrated circuit comprising:
   a first circuit to receive a single-ended signal and a reference voltage and to shift a common mode of the single-ended signal and the reference voltage based on a level-shifting current; and
   a second circuit coupled to provide the level-shifting current to the first circuit, the second circuit to adjust the level-shifting current based on a linearity parameter.

10. The integrated circuit of claim 9, further comprising:
    a preamplifier coupled to receive the single-ended signal and the reference voltage from the first circuit and to amplify the single-ended signal to obtain an amplified signal, wherein the linearity parameter is associated with the amplified signal; and
    a decision feedback equalizer (DFE) system coupled to receive the amplified signal and the reference voltage from the preamplifier and to generate a first average signal height of the amplified signal above the reference voltage and a second average signal height of the amplified signal below the reference voltage.

11. The integrated circuit of claim 10, further comprising logic coupled between the DFE system and the second circuit, wherein the logic is to:
    receive, from the DFE system, the first average signal height;
    receive, from the DFE system, the second average signal height;
    determine a difference between the first average signal height and the second average signal height, wherein the linearity parameter depends on the difference; and
    responsive to determining the difference between the first average signal height and the second average signal height is greater than a threshold criterion, provide an indication to the second circuit to adjust a first value of the level-shifting current to a second value of the level-shifting current.

12. The integrated circuit of claim 10, wherein the first circuit is further to attenuate at least one of the single-ended signal or the reference voltage to be within an operating range of the preamplifier.

13. The integrated circuit of claim 9, wherein the first circuit is further to level shift the reference voltage based on the level-shifting current.

14. The integrated circuit of claim 13, wherein the first circuit comprising a first linear equalization circuit to level-shift the common mode of the single-ended signal and a second linear equalization circuit to level-shift the reference voltage, wherein the first linear equalization circuit and second linear equalization circuit are the same circuit.

15. The integrated circuit of claim 10, wherein the preamplifier is a differential amplifier and the amplified signal is a differential signal.

16. A method of adjusting a single-ended signal of a receiver, the method comprising:
    receiving the single-ended signal and a reference voltage;
    amplifying the single-ended to obtain an amplified signal;
    adjusting a level-shifting current based on a linearity parameter associated with the amplified signal; and
    shifting a common mode of the single-ended signal based on the level-shifting current.

17. The method of claim 16, further comprising:
    determining a first average signal height of the amplified signal below the reference voltage;
    determining a second average signal height of the amplified signal above the reference voltage;
    determining a difference between the first average signal height and the second average signal height, wherein the linearity parameter depends on the difference; and
    responsive to determining the difference between the first average signal height and the second average signal height is greater than a threshold criterion, adjusting a first value of the level-shifting current to a second value of the level-shifting current.

18. The method of claim 16, further comprising shifting the reference voltage based on the level-shifting current.

19. The method of claim 16, further comprising attenuating at least one of the single-ended signal or the reference voltage to be within an operating range of a preamplifier associated with the receiver.

20. The method of claim 16, wherein the receiver is located within a dynamic random access memory (DRAM) or within a processing device.

* * * * *